Jan. 4, 1927.
J. E. MAYHEW
CONFECTIONERY CONTAINER
Filed July 6, 1925
1,613,282
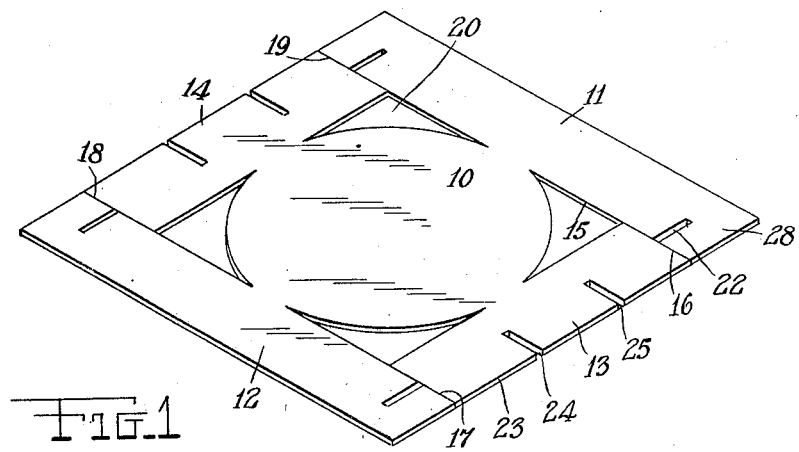
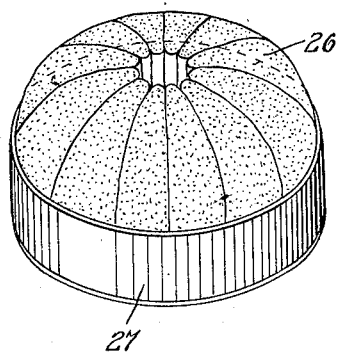
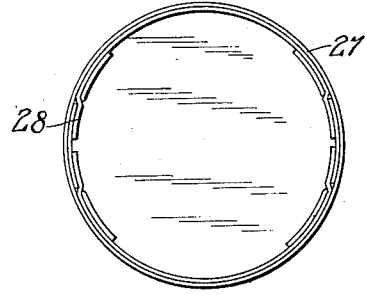
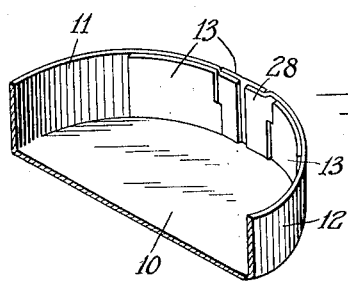
INVENTOR
J. E. Mayhew
BY
ATTORNEY Patented Jan. 4, 1927.

1,613,282

UNITED STATES PATENT OFFICE.

JAMES E. MAYHEW, OF BROOKLYN, NEW YORK.

CONFECTIONERY CONTAINER.

Application filed July 6, 1925. Serial No. 41,696.

This invention relates to boxes used as containers for confectionery and the like and has for its main purpose the construction of a circular container entirely composed of one piece and so folded as to provide a cylindrical box in which the confectionery may be partly exposed in a sanitary manner when on sale.

The above and other objects will become apparent in the description below, in which characters of reference refer to like-named parts in the drawing.

Referring briefly to the drawing, Figure 1 is a perspective view of the formed blank from which the container is constructed.

Figure 2 is a perspective view of the container as filled with confectionery.

Figure 3 is a top plan view of the container, showing the method of filling the same.

Figure 4 is a perspective view, showing a half of the folded container and the method of joining the cooperating sides to form a circular container.

Referring in detail to the drawing, Figure 1 illustrates a perspective of the complete blank. This blank consists of a central circular disk 10 which has a pair of opposing long sides 11 and 12 joined thereto at diametrically opposite positions. These long sides are joined to the tangent of the disk and are integral therewith, as illustrated in Figure 1. At ninety degrees, or at right angles to the long sides, a pair of short sides 13 and 14 are joined to the disk 10 in a similar manner, the junction occurring at the inner edge of the sides and at the tangent of the disk 10. The ends of the short sides abut the inner edges 15 of the long sides when the blanks are formed. The entire container construction comprising the disk 10, the long sides 11 and 12, and the short sides 13 and 14, is constructed of an integral piece of paper and is sheared at 16, 17, 18, and 19, to part the sides of the blank into long sides 11 and 12, and short sides 13 and 14, these sides forming the rim or encircling walls of the container when they are interlocked. The only portions of the blank which are removed are substantially triangular areas 20 which exist between the corners of the short and long sides and the periphery of the disk 10. The inner edges 15 of the long sides and near their corners, are provided with slits 22 which extend half-way across the width of the long sides near the ends thereof and open upon the edge 15. The outer edges 23 of the short sides are provided with a pair of slits 24 and 25. These slits 24 and 25 extend and open on the outer edges of the short sides and course half-way across the width of these sides at spaced-apart positions intermediate the length of the short sides. This blank, as just described, provides a complete cylindrical container which has an exposed upper portion and is adapted to receive confectionery of various geometrical forms such as the shape of an orange, as illustrated in Figure 2. The segments 26 consist of individual pieces of candy which may be packed one alongside of the other in the container until the latter is completely filled, as illustrated. The container is adapted to be of such dimension that one-half of these segments are exposed above the upper rim of the container. The separate band 27 is adapted to encircle the sides of the container when formed and is slipped over these sides when the latter have been interlocked, which will be more fully hereinafter described.

The container is primarily adapted for the storage of confections which are to be hygienic and at the same time, advertised. This is accomplished by the cooperation of the band 27 and the construction of the container which permits the article contained therein to be exposed in a sanitary manner. The blank, after being formed as illustrated in Figure 1, is ready for folding into the shape it ultimately acquires. The short sides 13 and 14 are first bent upwardly at right angles to the plane of the disk 10 at the junction between the disk and these sides 13 and 14. After these short sides have been folded in the manner described, the long sides 11 and 12 are similarly folded upwardly to lie at right angles to the plane of the disk 10. The short sides are then curved around the edge of the disk 10 and the ends of the long sides 11 and 12 are placed externally of the outer surface of the sides 13 and 14 so that the slits 22 are interlocked with the slits 25 on the short sides 13 and 14. When these slits have been interlocked in the manner described, the ends 28 of the long sides rest within the body of the container, as the slits by interlocking necessitate the shifting of these ends 28 from the outer surface of the short sides 13 and 14 to the inside of the short sides 13 and 14. As the gauge of the material from which these containers are made is relatively small or thin, these ends 28 form no obstructions within the container and the confectionery segments 26 may be readily packed in the container. In order to expose an article of this type, the laws require that it be hygienically packed. This is done by covering the entire exposed surfaces of the confectionery in the container with a transparent film of material such as cellulose paper. This film envelopes the entire exposed portion of the segments 26 and also the exterior surfaces of the long sides 11 and 12, and short sides 13 and 14. The ring or band 27 is then slipped over the container and completely covers these short and long sides of the container and is adapted to have printing impressed thereon for advertising the article in the container.

I claim:—

A container formed of a square sheet of material, said container comprising a bottom and circular walls surrounding said bottom, the walls being composed of a plurality of interlocking sections, said sections comprising a pair of long sides extending tangentially from opposite sides o the bottom, said bottom being circular in outline, a pair of short sides extending tangentially from opposite sides of the bottom at a position 90 degrees removed from the center of the long sides, means for interlocking the short sides with long sides to form a circular wall comprising a pair of slots extending from the outer edges of the short sides, said long sides having a slot at each corner, the slots of the long sides being adapted to enter into the slots of the short sides when trained around the outline of the bottom.

In testimony whereof I affix my signature.

JAMES E. MAYHEW.